US008606041B2

(12) United States Patent
Keyes et al.

(10) Patent No.: US 8,606,041 B2
(45) Date of Patent: Dec. 10, 2013

(54) METHOD OF LOCAL TRACING OF CONNECTIVITY AND SCHEMATIC REPRESENTATIONS PRODUCED THEREFROM

(75) Inventors: Edward Keyes, Ottawa (CA); Vyacheslav L. Zavadsky, Ottawa (CA)

(73) Assignee: Semiconductor Insights, Inc., Kanata (CA)

( * ) Notice: Subject to any disclaimer, the term of this patent is extended or adjusted under 35 U.S.C. 154(b) by 879 days.

(21) Appl. No.: 12/029,199

(22) Filed: Feb. 11, 2008

(65) Prior Publication Data
US 2009/0092285 A1 Apr. 9, 2009

(30) Foreign Application Priority Data

Oct. 3, 2007 (CA) ...................................... 2605234

(51) Int. Cl.
G06K 9/00 (2006.01)
G06K 9/36 (2006.01)

(52) U.S. Cl.
USPC .......................................... 382/284; 382/141

(58) Field of Classification Search
USPC .................... 382/141, 284; 345/629, 632, 634
See application file for complete search history.

(56) References Cited

U.S. PATENT DOCUMENTS

| 5,694,481 | A  | * | 12/1997 | Lam et al. ...................... 382/145 |
| 5,825,191 | A  | * | 10/1998 | Niijima et al. ............ 324/754.22 |
| 6,236,746 | B1 | * | 5/2001  | Chamberlain et al. ........ 382/145 |
| 6,249,616 | B1 |   | 6/2001  | Hashimoto |
| 6,289,116 | B1 | * | 9/2001  | Chamberlain et al. ........ 382/141 |
| 6,453,063 | B1 | * | 9/2002  | Phaneuf et al. ................ 382/145 |
| 6,563,943 | B1 | * | 5/2003  | Sasada ........................... 382/132 |
| 6,907,583 | B2 |   | 6/2005  | Abt et al. |
| 7,013,028 | B2 |   | 3/2006  | Gont et al. |
| 2003/0084409 | A1 | * | 5/2003  | Abt et al. ........................... 716/1 |
| 2005/0060287 | A1 | * | 3/2005  | Hellman et al. .................. 707/2 |
| 2005/0226521 | A1 | * | 10/2005 | LaChance et al. ............ 382/254 |
| 2006/0257051 | A1 |   | 11/2006 | Zavadsky et al. |

FOREIGN PATENT DOCUMENTS

CA 2497592 9/2005

OTHER PUBLICATIONS

Logic flow-driven partitioning, IBM Technical Disclosure Bulletin, Apr. 1990. (Note: Authorship is not available.).*
Scott et al. ("Magic's Circuit Extractor," Conference on Design Automation, 1985, 286-292).*
Ajmal S. Mian et al., *Automatic Correspondence and Global Registration of Range Images for 3D modeling*, The School of Computer Science and Software Engineering, University of Western Australia, vol. 35, Part 3, pp. 118-121.
Jiangjian Xiao et al., *Layer-Based Video Registration*, Computer Vision Lab, University of Central Florida, vol. 16, Feb. 2005, pp. 75-84.

(Continued)

*Primary Examiner* — Yubin Hung
(74) *Attorney, Agent, or Firm* — Workman Nydegger

(57) ABSTRACT

A schematic diagram detailing a circuit that was reverse engineered from a plurality of images taken of the circuit is provided. The schematic diagram includes at least one circuit element that was represented as an object in at least one of the plurality of images, such that signal continuity information was determined through local tracing of connectivity between a first image and a second image of the plurality of images. A method of tracing the connectivity within the plurality of images to produce the schematic diagram is also disclosed.

4 Claims, 13 Drawing Sheets

(56) References Cited

OTHER PUBLICATIONS

M. Brown et al., *Recognising Panoramas*, Proceedings of the 9th International Conference on Computer Vision, Oct. 2003, pp. 1218-1225.

Lisa Gottesfeld Brown, *A Survey of Image Registration Techniques*, Department of Computer Science, Columbia University, Jan. 12, 1992, pp. 1-60.

Richard Hartley et al., *Multiple View Geometry in Computer Vision*, Cambridge University Press, 2000, pp. 568-627.

Bill Triggs et al, *Bundle Adjustment—A Modern Synthesis*, Springer-Verglas, 2000, pp. 1-71.

Thomas H. Cormen, *Data Structures for Disjoint Sets*, Introduction to Algorithms 2nd Edition Cambridge MIT Press, 2001, pp. 498-517.

Jacob Holm et al., *Poly-Logarithmic Deterministic Fully-Dynamic Graph Algorithms II: 2-edge and Bioconnectivity*, Proceedings of the 30th Annual ACM Symposium on Theory of Computing, Copenhagen, Denmark, 1998, pp. 79-89.

Sang Hongshi et al., *A Connected Components Labeling Algorithm for Multi-Value Image that Suitable for Realization in VLSI*, J. Huazhong University of Science & Technology, vol. 33, No. 9, Sep. 2005, pp. 5-8.

\* cited by examiner

| 0 | 1 |
|---|---|

610

| 0 | 0 |
|---|---|

611

| 2 | 3 |
|---|---|

612

| 0 | 0 | 0 | 3 |
|---|---|---|---|

METHOD OF LOCAL TRACING OF CONNECTIVITY AND SCHEMATIC REPRESENTATIONS PRODUCED THEREFROM

CROSS-REFERENCE TO RELATED APPLICATIONS

This application claims priority to Canadian Application No. 2,605,234, filed Oct. 3, 2007, which for purposes of disclosure is incorporated herein by specific reference.

BACKGROUND OF THE INVENTION

1. The Field of the Invention

The present invention generally relates to image analysis techniques and more particularly relates to a method and apparatus for tracing connectivity in a mosaic of images.

2. The Relevant Technology

When analyzing objects using high magnification imaging techniques it is often the case where the area of interest for analysis exceeds the field of view of the imaging device. In such a situation, the area of interest is imaged in a so-called step-and-repeat fashion, whereby multiple images are acquired in a grid pattern that is organized as a series of rows and columns with intentional overlap between adjacent images. The images are then arranged to produce a composite or mosaic of the area of interest.

The analysis of integrated circuits (IC's) is a particular case where a mosaic of high magnification images may be required for purposes including reverse engineering, circuit analysis or quality control. As IC's generally include multiple layers of interconnected circuitry, such a mosaic of the entire circuit would require images from each layer of the IC. A single large image or model is then assembled by stitching together adjacent images of the mosaic using translational and/or rotational movements thereof. This model can generally have either two or three dimensions, where a two-dimensional (2D) model is constructed from mosaics from a single level within the IC, and where a three-dimensional (3D) model is constructed from mosaics from different levels within the IC.

Numerous techniques have been developed for the generation of a 2D/3D model from a mosaic. If one is given a pair of images with overlap between them, it is typically possible to stitch them together using a procedure called pair-wise registration, which is a well-known technique in the art. Pair-wise registration is used to digitally stitch together the images on a common plane by minimizing registration errors. Pair-wise registration accomplishes this through calculation of the relative image coordinates of a pair of images, and the selection of a single pair of corresponding points between the two images. More images may be pair-wise registered by applying a similar technique to another image and the previously registered image pair. Such a registration can be performed by techniques described in the paper "A survey of image registration techniques" by L. Brown, ACM Computing Surveys, Vol. 24, Issue 4, 1992, incorporated by reference herein.

However, there are drawbacks in using the above-noted techniques when there are more than three images in the mosaic. If, for example, there are four images, e.g., images 1 through 4, with each image located in the corner of a square, there are four overlap areas that need to be aligned. One might ideally stitch the seams of image pairs (1,2) and (1,3) using translation only. However, by so doing, it would not be possible to stitch seams (2,4) and (3,4). Depending on the position of image 4, generally only one of image pairs (2,4) and (3,4) can be aligned without errors. If only one pair can be aligned, a bundle adjustment procedure may be performed to find an acceptable distribution of error, such that the error in each overlap area is within a certain tolerable range.

Briefly, bundle adjustment procedures implement energy minimization techniques to select appropriate transformations of images where overall (e.g., sum or maximum) alignment error is minimized globally for all overlap areas. In the simplest form, for 2 dimensional grids where only image movement in the X and Y directions is allowed, a simple least squares procedure can be used.

Bundle adjustment techniques can be implemented, not only for the production of a model, but they can also be used to detect an overlap region in which the alignment information introduces excessive errors to the model. An implementation of bundle adjustment techniques can be found in the applicant's co-pending U.S. patent application publication no. 2006/0257051, disclosed by Vyacheslav Zavadsky et al.

While most of the literature on bundle adjustment deals with the more complicated problem of producing a 2D/3D model in the case of a moving camera, the same methods can be applied to producing global stitching of an image mosaic after mathematical reduction to the model as described in, for example, B. Triggs, P. McLauchlan, R. Hartley, and A. Fitzgibbon, "Bundle Adjustment—A Modern Synthesis" in B. Triggs, A. Zisserman, and R. Szeliski, Vision Algorithms: Theory & Practice (Springer-Verlag, 2000).

A further complication in stitching images together arises when the pair of images depicts objects in a highly repetitive area, such as, for example, within a memory array. In this case, distinctive features may be too small or masked by overall noise.

In cases where the imaging of 3D objects is performed while either the object or the camera is moving, modeling may require running a complicated stereovision algorithm to form a 3D model of the stitched object. However, it will be apparent to the skilled artisan that the computational requirements for model building can become very large. For ICs, the minimum feature size is continually decreasing due to advances in the manufacturing processes. These decreases in turn increase the number of images that have to be aligned to produce the required 2D/3D model. As such, the computational resources required to produce a global 2D/3D model are becoming too large. Further, there is considerable overall implementation complexity, including factors to consider such as considerable research-level engineering, and familiarity with image processing, energy minimization (bundle adjustment), and robust statistics fields. Therefore, alternate methods of circuit analysis are quickly becoming important.

The discussion so far has considered the development of a 2D/3D model for a circuit. For an IC, there is a second stage of tracing connectivity that provides for signal continuity throughout the model. The various known techniques of the art have taken the approach that, first, a 2D/3D model of the IC is constructed, and then, second, connectivity is traced. The accuracy of the generated 2D/3D model will generally determine whether the connectivity tracing requires manual intervention, or if it can be advantageously performed in an automated fashion.

An exemplary prior art method is presented in FIG. 1. Overall, the method 100 provides a 2D or 3D model of aligned images and then traces connectivity through the overall model. At step 102, objects are detected for each image. The cycle 103 repeats step 102 until objects are detected for all images. After completing the cycle 103, step 106 is followed to produce a combined 2D or 3D model of all aligned images. Next, a combined model of the objects according to the combined 2D/3D model of aligned images is produced at step 108. As a final step, any connectivity between the objects is traced at step 110.

Although most implementations of the method 100 perform step 102 independently for each image, object detection can alternatively be performed on an aligned model that is produced at step 106. In this case, step 102 and cycle 103 would be combined into a step of detecting objects in the aligned model produced at step 106.

There are also variations on how step 106 is implemented in the art. In FIG. 2, a prior art method 200 of producing a 2D or 3D model is shown as an alternative for implementing step 106. A pair-wise alignment of an overlapped image pair is performed at step 206. Step 206 is repeated through cycle 207 for each overlapping pair of images. At step 208, a bundle adjustment is performed for alignment correction purposes. The method 200 is repeated at through cycle 209 for each image mosaic. Once the images are aligned, the points of alignment between each mosaic are determined at step 212. This is repeated through cycle 213 for each pair of overlapping mosaics. A 2D or 3D model is produced at step 214 and connectivity is traced at 216.

In published U.S. Patent application publication no. 2005/0226521, disclosed by A. Lachance and Z. Blaxell, the portion of method 200 ending at step 209 is replaced by a step of producing a coarse alignment for each mosaic. Step 212, i.e., the step of finding points of alignment between overlapped mosaics is performed by matching the ends of wires to vias. As a result, each image in a given mosaic is moved according to average displacements found during matching. However, while the images are being moved for inter-layer displacement, the intra-layer mosaic may be broken.

U.S. Pat. No. 6,249,616, issued to Hashimoto, discloses a method of aligning a single image mosaic when the images thereof are taken from different positions/different angles, which would require 3D model. The patent discloses a simplification for a bundle adjustment model because of the challenges faced in the art to perform the bundle adjustment on the entire model. As such, approaches for simplifying the bundle adjustment models are considered. However, these approaches presumably increase the likelihood of alignment errors in the overlap areas. It also presents a method for aligning a single image mosaic when the images of the mosaic are taken from different positions/different angles. However, this approach requires the production of 3D model, which adds to the level of complexity in aligning images because a 3D model must first be produced.

A paper by M. Brown and D. G. Lowe, "Recognizing Panoramas" Proceedings of the 9th International Conference on Computer Vision (ICCV2003) (Nice, France: October 2003), 1218, presents a method of aligning a single mosaic of images into panoramic view. Points of interest (Scale Invariant Feature Transform (SIFT) features) are detected, and then matched to each other based on pair-wise alignment. Spurious points of correspondence are deleted using the Random Sample Consensus (RANSAC) approach and the panorama is stitched using global bundle alignment. The author suggests that the method can be used for aligning multiple mosaics, however the bundle adjustment suggested produces some visible artifacts.

In applicant's co-pending U.S. patent application publication no. 2006/0257051, which is herein incorporated by reference, applicant discloses a method for providing an aligned 3D model of multiple mosaics as would be appropriate for automated connectivity tracing. This application teaches that step 206 (shown in FIG. 2) may be performed with template matching. The application also teaches additional methods to detect pairs with either ambiguous or no information. Furthermore, the application teaches that step 212 may be performed by either operators entering points of correspondence, or by matching vias to wires in the case of IC images. Finally, a global bundle adjustment least squares model is disclosed. The model allows the distribution of errors between inter- and intra-mosaic overlap. The main drawback is the complexity of the method.

As such, there is no known technique in the art that is capable of producing a combined 3D model of multi-mosaic images with precision sufficient for automated signal tracing.

As such, it would be advantageous to have a method of automating connectivity tracing in a manner that does not require the prior generation of a highly accurate 2D/3D model. Therefore, there is a need for a method that can perform automated connectivity tracing without forming a global 2D/3D model of the aligned mosaics. Furthermore, there is a need for a method of providing connectivity tracing that is independent of the scale of the IC.

SUMMARY OF THE INVENTION

The invention seeks to overcome at least one of the prior art drawbacks of image analysis techniques used in the generation of a schematic diagram of an IC.

Embodiments of the invention seek to enable connectivity to be traced separately in each overlap area thereby avoiding the need to provide a global 3D model.

One embodiment is a schematic diagram detailing an integrated circuit (IC) that was reverse engineered from a plurality of images of the IC, the schematic diagram comprising: at least one circuit element represented as an object, a portion of the object being in at least one of the images in the plurality of images; at least one location attribute specifying the location of the circuit element in the IC with which the at least one location attribute is associated; and signal continuity information determined through local tracing of connectivity between a first image and a second image of the plurality of images.

Another embodiment is a diagram detailing a network of connected elements that was reverse engineered from a plurality of images of the network, the diagram comprising: at least one element that was represented as an object in at least one of the images in the plurality of images; and signal continuity information determined through local tracing of connectivity between a first image and a second image of the plurality of images.

Another embodiment is a method of automated tracing of connectivity within a plurality of images having at least a first image and a second image, the first image and the second image being aligned such that there is a region of overlap therebetween, the method comprising steps of: (a) detecting at least a first object in the first image; (b) putting a representation of the first object in a data structure; (c) detecting at least a second object in the second image; (d) putting a representation of the second object in the data structure; and (e) merging the representation of the first object with the representation of the second object into the data structure if the first object and the second object are linked in the area of overlap between the first and the second image.

Another embodiment is a method of tracing connectivity within a mosaic of images, the mosaic having at least a first image and a second image, and the mosaic having a first object, the first object having a first portion in the first image, a second portion in the second image, and a third portion in a region of overlap between the first image and the second image, the first portion having a source, the method comprising steps of: (k) placing a representation of the first portion in a queue; (l) marking the source; (m) taking the representation of the first portion from the queue; (n) marking the first portion and third portion, wherein the first portion comprises the source and the third portion is connected to the first portion; (o) placing a representation of the third portion in the queue; (p) taking the representation of the third portion from the queue; and (q) marking the second portion to provide a connectivity trace from the first portion to the third portion.

Another embodiment is a method of tracing connectivity within a mosaic of images, the images as a whole having at least one object and having a region of overlap therebetween, the method comprising steps of: (s) tracing connectivity within each image of the mosaic of images; (t) creating a model from the mosaic; (u) creating a connectivity graph; and (v) changing the connectivity graph if there is at least one error in alignment of an object in the overlap region between the first and second image.

Other aspects and advantages of the invention, as well as the structure and operation of various embodiments of the invention, will become apparent to the skilled artisan upon review of the following description of the invention in conjunction with the accompanying drawings.

BRIEF DESCRIPTION OF THE DRAWINGS

The invention will be described with reference to the accompanying drawings, wherein:

FIG. 6*b* is a pictorial diagram of a disjoint set implemented in connectivity tracing according to an embodiment of the invention;

DETAILED DESCRIPTION OF THE PREFERRED EMBODIMENTS

For purposes of explanation, specific embodiments are set forth to provide a thorough understanding of the present invention. However, it will be understood by the skilled artisan that the invention may be practiced without all of the specific details set out in this detailed description. Moreover, well-known elements, devices, process steps and the like are not set forth in detail in order to avoid obscuring the scope of the invention described.

Embodiments of the invention are primarily directed to a method (process) for tracing connectivity separately in each overlap area, as well as a product derived from that method, namely a schematic diagram. While the various embodiments of the invention will be described in regard to ICs, it will be apparent to the skilled artisan that the methods of the various embodiments are equally applicable to other fields where there is a need to trace connectivity or undertake a similar analysis. These other fields, which are within the scope of the invention include, but are not limited to, tracing flow capacities, tracing of roads in aerial and/or satellite photography mosaics, and medical imaging. Additional solutions for the tracing of connectivity include, for example, the computation of flow capacities, and the calculation of the shortest/fastest/longest paths. Other fields will be apparent to the skilled artisan.

When directed to the field of IC analysis the various embodiments of the invention allow for the automated local tracing of connectivity without requiring the prior development of a high precision 2D/3D model incorporating all of the analyzed objects. Differences between the local tracing of connectivity and global tracing of connectivity, as is performed in traditional methods of connectivity tracing, can be appreciated with reference to FIG. 6*a*.

Figure 6A:
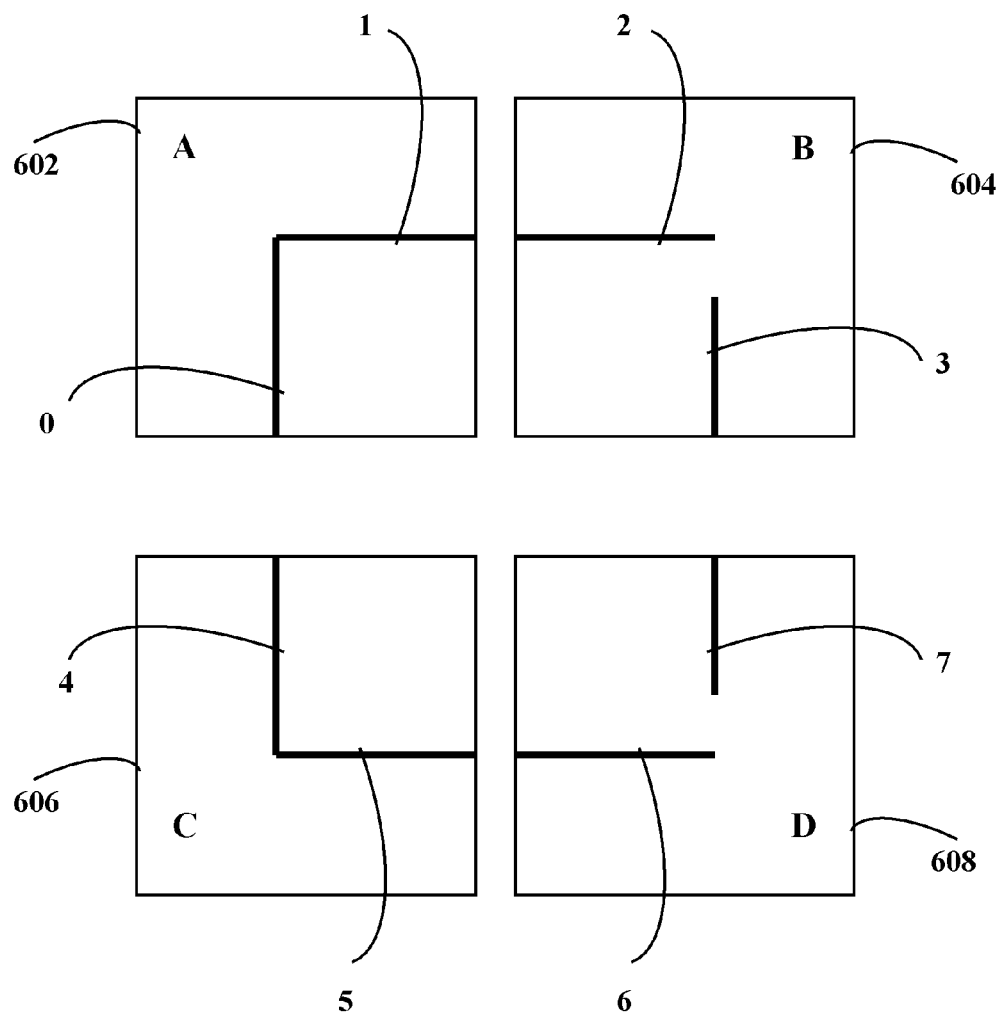
FIG. 6*a* is a schematic diagram of four images for which connectivity is traced according to another embodiment of the invention.

With reference to FIG. 6*a*, one may wish to mosaic images A 602, B 604, C 606 and D 608 to create a model. Mosaicing of images A 602 and B 604; and A 602 and C 606 can be performed with minimal error. However, the area of overlap between images B 604 and D 606, and C 608 and D 606 is more complicated because of the difficulty of aligning images C and D once images A and B are aligned. Errors in the alignment of objects may still be present to a degree sufficient to create errors in connectivity when it is traced after the creation of a global model. Even after the implementation of expensive image analysis techniques to create the mosaic connectivity, errors are still possible. This contrasts the various embodiments of the invention where the connectivity is traced locally for the four overlap areas, using aligned pairs of images.

Figure 1:
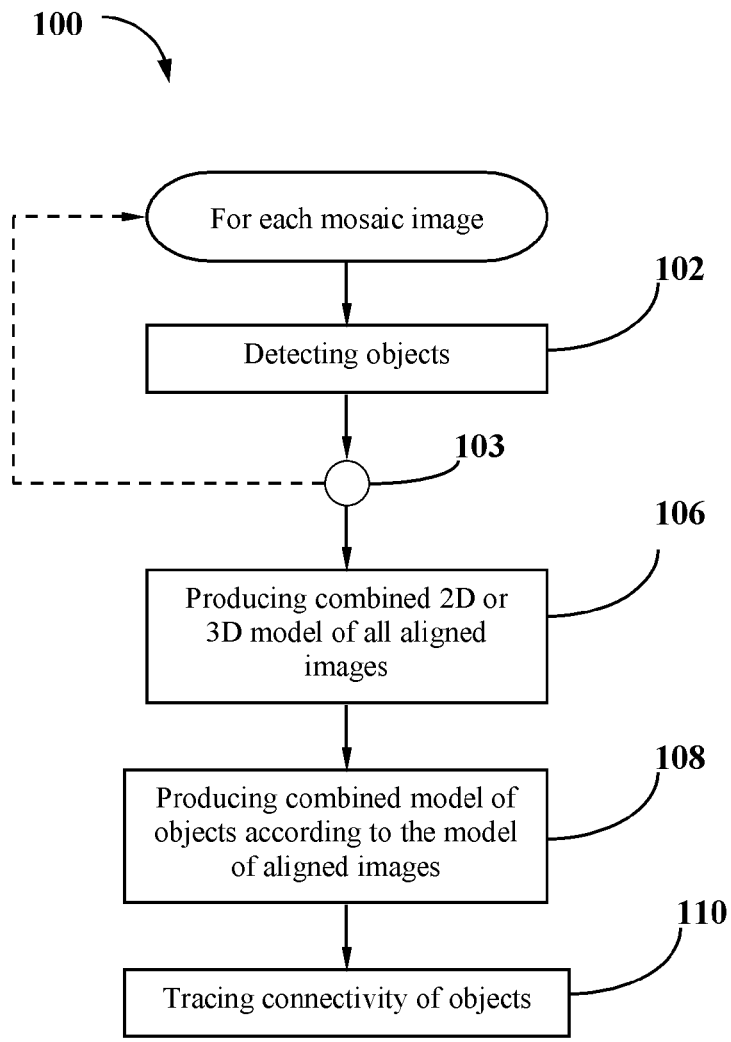
FIG. 1 is a flow chart of image analysis according to the prior art.
Figure 2:
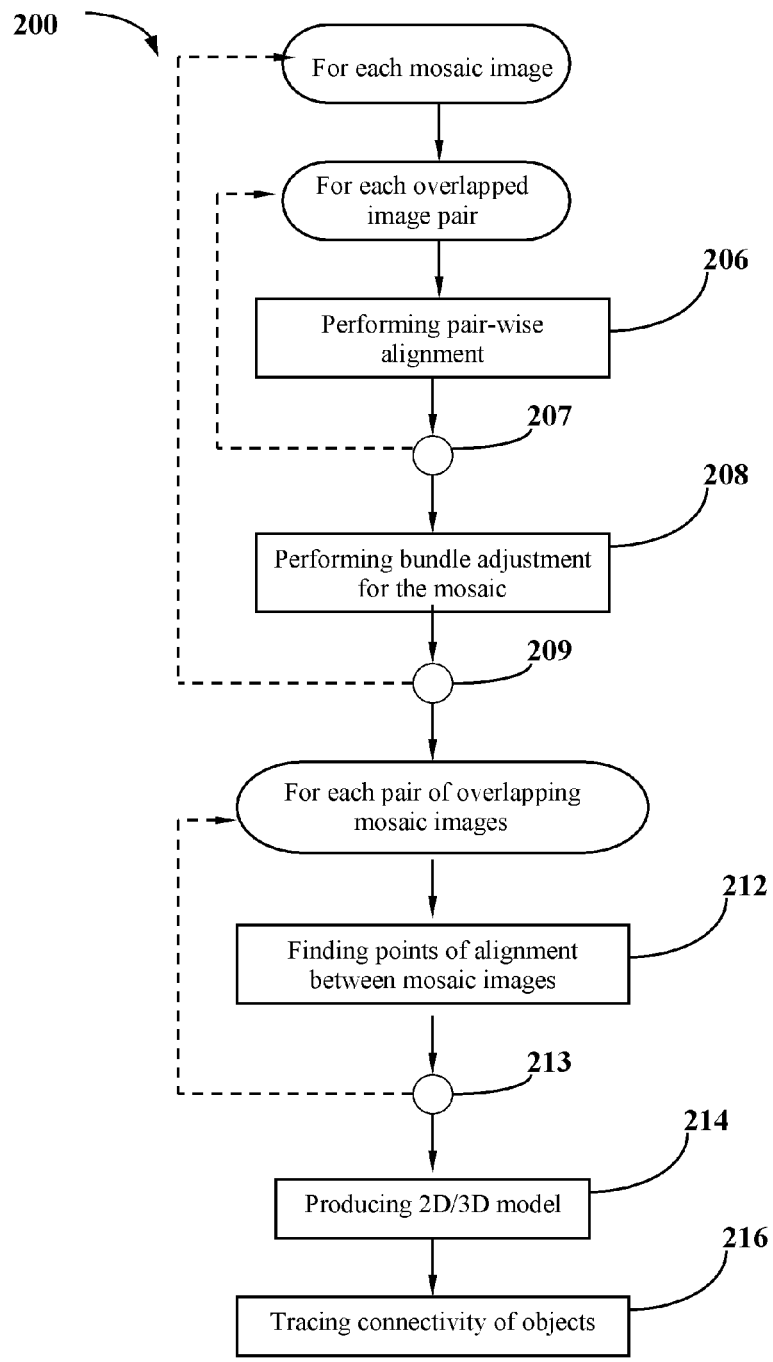
FIG. 2 is a flow chart of image analysis according to the prior art.
Figure 3A:
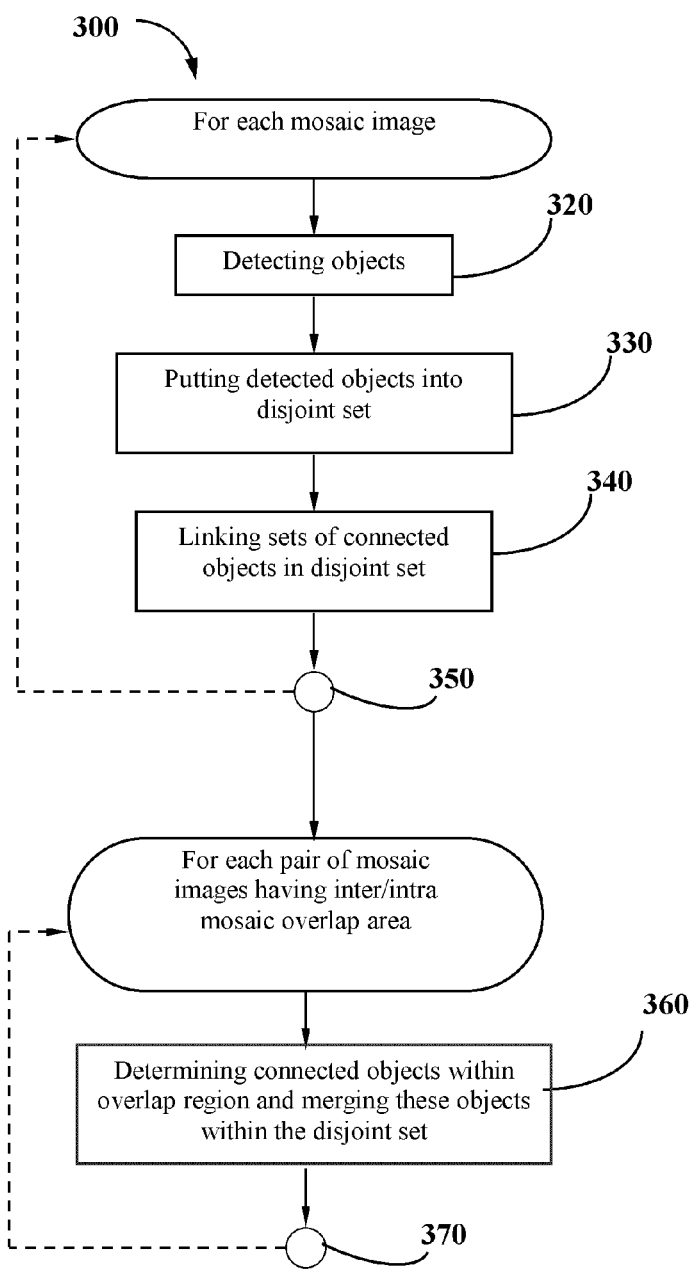
FIG. 3*a* is a flow chart of connectivity tracing according to an embodiment of the invention.
Figure 6B:
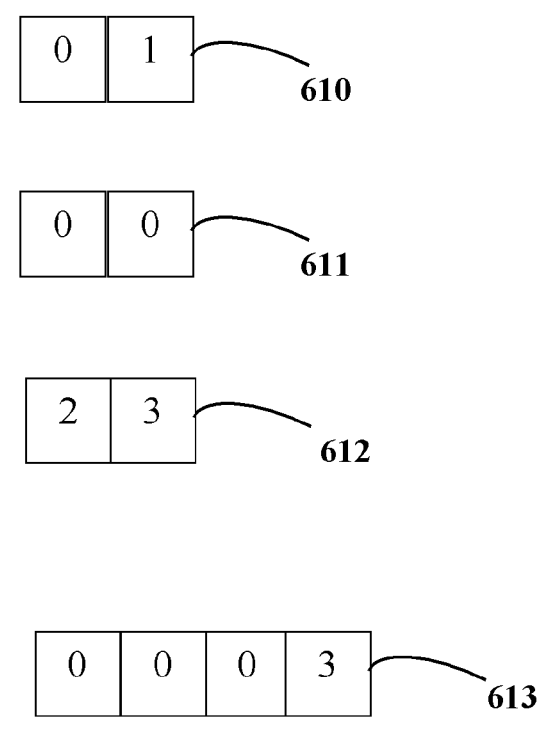

A method 300 for tracing connectivity according to an embodiment of the invention is presented in FIG. 3*a*. This embodiment is applicable to tracing connectivity within a mosaic that comprises a plurality of images. The method 300 will be discussed with reference to FIGS. 6*a* and 6*b*, where FIG. 6*b* presents a pictorial representation of a disjoint set.

The various embodiments of the invention implement disjoint sets as a means of representing a data structure. The nature of data structures for disjoint sets will be apparent to the skilled artisan. They are described in detail in the following reference: Thomas H. Cormen, Charles E. Leiserson, Ronald L. Rivest, Clifford Stein, Introduction to Algorithms—2nd Edition, (Cambridge: MIT Press, 2001) c. 21. To briefly explain, given a set of elements, it is often useful to break them up or partition them into a number of separate, non-overlapping sets. A disjoint-set data structure keeps track of such partitioning. For example, in relation to ICs, the electrical signals are partitioned into sets of objects to denote that the signals within each set are connected, but to also denote that there is no connection between the respective sets of signals.

It should be mentioned that the term object as used in the various embodiments is used generically. The term object can represent, but is not limited to, an individual pixel of an image identified as belonging to an object of interest, a group of pixels of an image representing detected primitives (e.g., a line or arc), a group of pixels of the image representing a complicated object, a vector model for the primitive or complicated object, etc. Appropriate connectivity models for each of the above broad categories of objects would be apparent to the skilled artisan (e.g., 4 or 8 connectivity for pixels, line intersections, etc.).

Referring now to FIG. 3a, for each image in the mosaic, the objects within the image are detected at step 320. Representations of the detected objects are then placed in a disjoint set at step 330. Next, step 340 links sets of connected objects. Therefore, with reference to FIGS. 6a and 6b, image A 602 (as shown in FIG. 6a) has objects 0 and 1. Step 320 detects objects 0 and 1, and then step 330 places representations thereof in a disjoint set 610 (as shown in FIG. 6b). The objects 0 and 1 are linked at step 340 because the linked objects 0 and 1 are connected. Thus, step 340 results in both objects 0 and 1 being represented as object 0 in the disjoint set 611 (as shown in FIG. 6b). At cycle 350, the above steps are repeated for the next image, and each subsequent image. As such, following the example shown in FIG. 6a, step 320 detects objects 2 and 3 of image B 604. Step 330 then places representations of objects 2 and 3 in the disjoint set 612. Because objects 2 and 3 are not connected, step 340 does not link the objects. Thus, after step 340, disjoint set 612 remains the same.

As previously mentioned, steps 320 through 350 are repeated until all of the images have been considered and a final disjoint set is produced.

With all of the individual images analyzed the overlap areas between images are now considered. For each pair of mosaic images having inter- or intra-mosaic overlap areas, step 360 determines which objects in respective regions are connected in overlap regions. For all connected objects, step 360 merges these connected objects into the same disjoint set. Step 360 is repeated for each pair of mosaic images having inter- or intra-mosaic overlap areas through cycle 370.

By way of reference to the example shown in FIGS. 6a and 6b, for the overlap region between the image A 602 and the image B 640, the objects 0 and 2 are determined as being connected and are therefore merged at step 360 to form disjoint set 613, represented now by the following objects: {0, 0, 0, 3}.

Figure 6C:
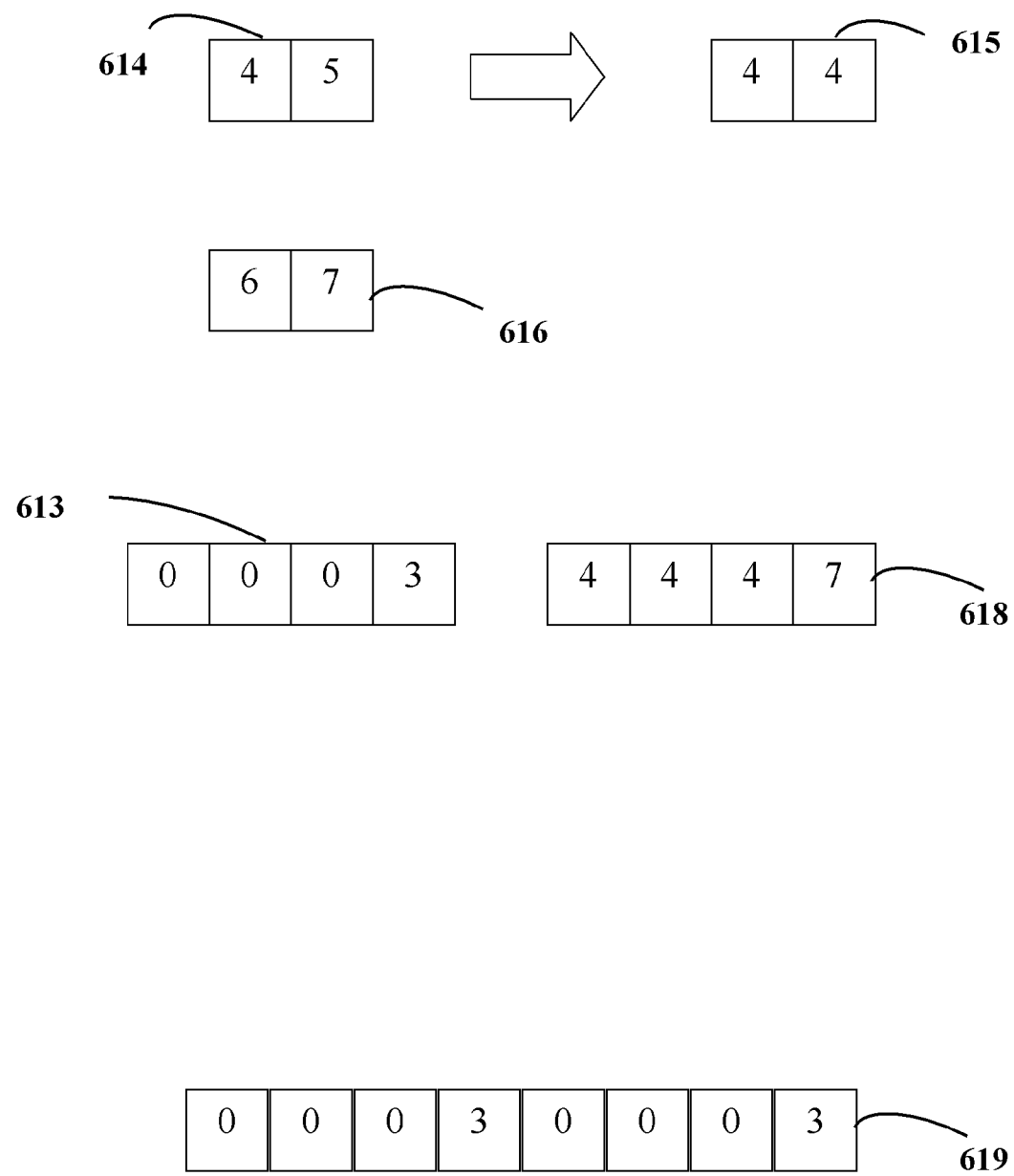
FIG. 6*c* is a pictorial diagram of a disjoint set implemented in connectivity tracing according to an embodiment of the invention.

With reference FIGS. 6a and 6c, the method 300 of FIG. 3a may be followed for images C 606 and D 608, after images A 602 and B 604. For image C 606, step 320 detects objects 4 and 5, and step 330 puts the detected object in a disjoint set 614. Next, step 340 links sets of connected objects in a disjoint set 615 because objects 4 and 5 are connected. The same steps 320, 330, and 340 are followed for image D 608; however, because objects 6 and 7 are not connected the disjoint set 616 does not change between steps 330 and 340 for image D 608.

Next, step 360 is repeated at cycle 370 for the next pairs of overlap regions between images A 602 and C 606, C 606 and D 608, and D 608 and B 604. According to the present example, for the pair of images C 606 and D 608, step 360 determines which objects are connected within the overlap area and merges the objects within the disjoint set. The resulting disjoint set for pairs C 606 and D 608 is represented as the disjoint set 617, {4, 4, 4, 7}, because objects B are connected to object 6. Once pairs A 602 and B 604, A 602 and C 606, C 606 and D 608, and D 608 and B 604 have been merged by step 360, a resulting disjoint set is represented as the final disjoint set 619, {0, 0, 0, 3, 0, 0, 0, 3}.

It should be mentioned that the order in which the pairs are selected for step 360 is not relevant due to the nature of the disjoint set data structure. It is obvious to a skilled artisan that a specific order may be implemented for more efficient processing.

Thus, at the end of the method 300, the connectivity is traced between all images of the mosaic, where the mosaic may represent a localized section of circuitry, or it might represent the entire circuit being analyzed.

Figure 3B:
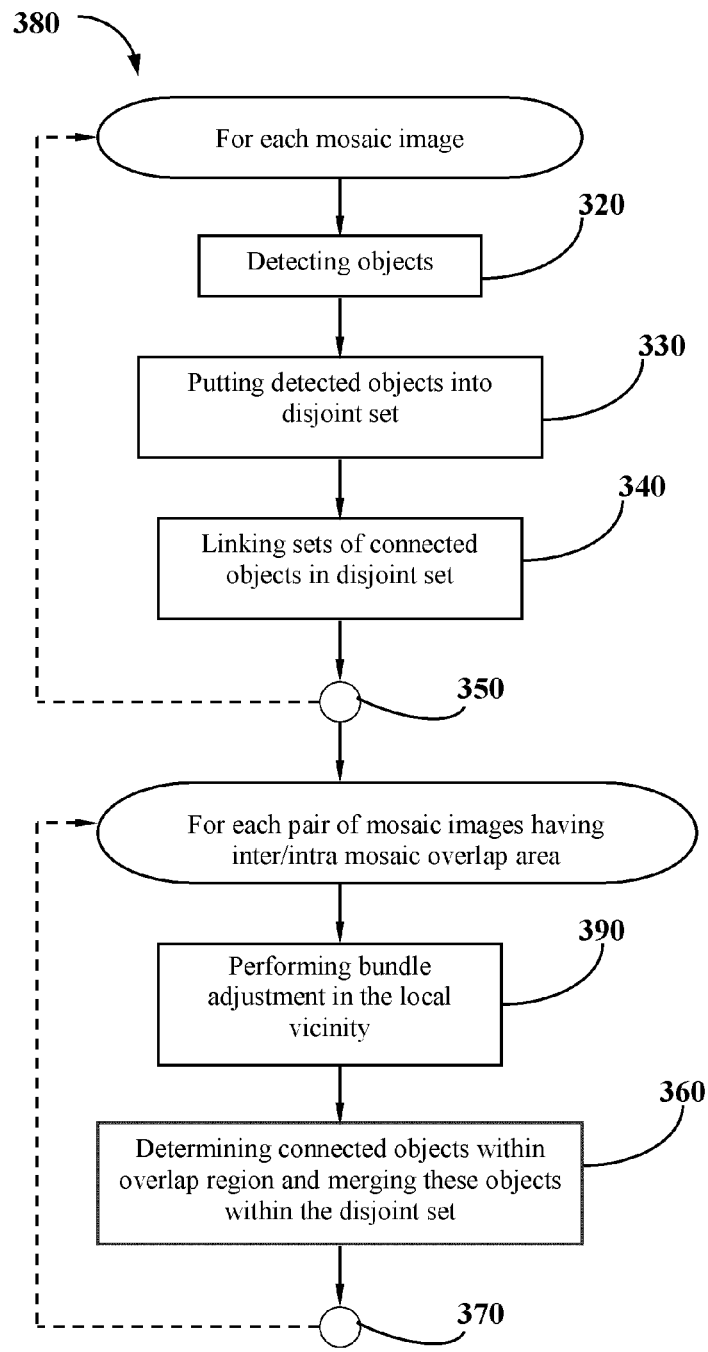
FIG. 3*b* is a flow chart of connectivity tracing according to an embodiment of the invention.

An alternative embodiment of method 300 is presented in FIG. 3b. Here, method 380 further includes step 390, which is executed prior to step 360. Step 390 performs a bundle adjustment in the local vicinity of the overlap area for the pair of mosaic images in the current cycle. The inclusion of a bundle adjustment process can be used to find overlap areas with incorrect or ambiguous information.

Figure 4A:
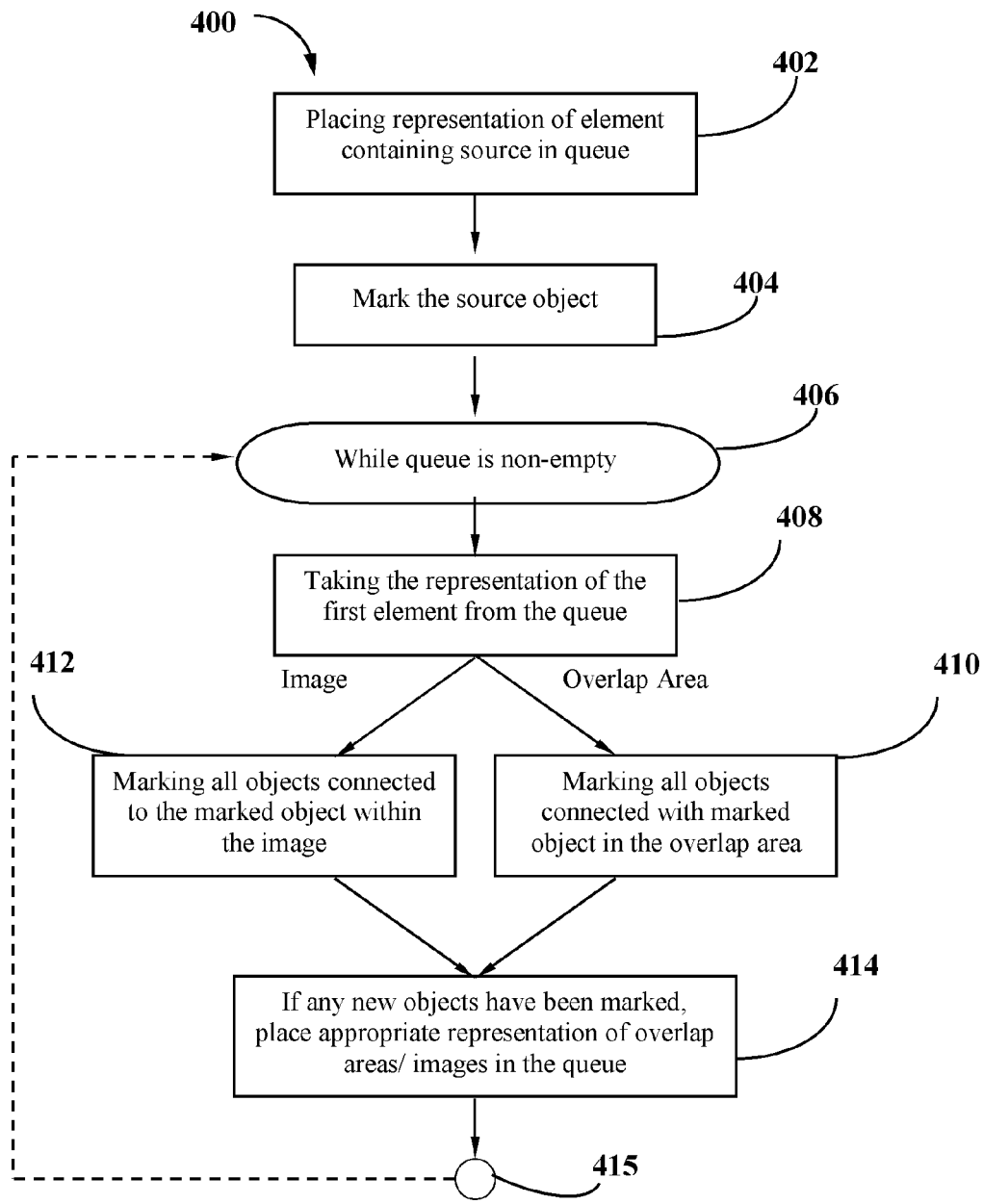
FIG. 4*a* is a flow chart of image analysis according to another embodiment of the invention.
Figure 5A:
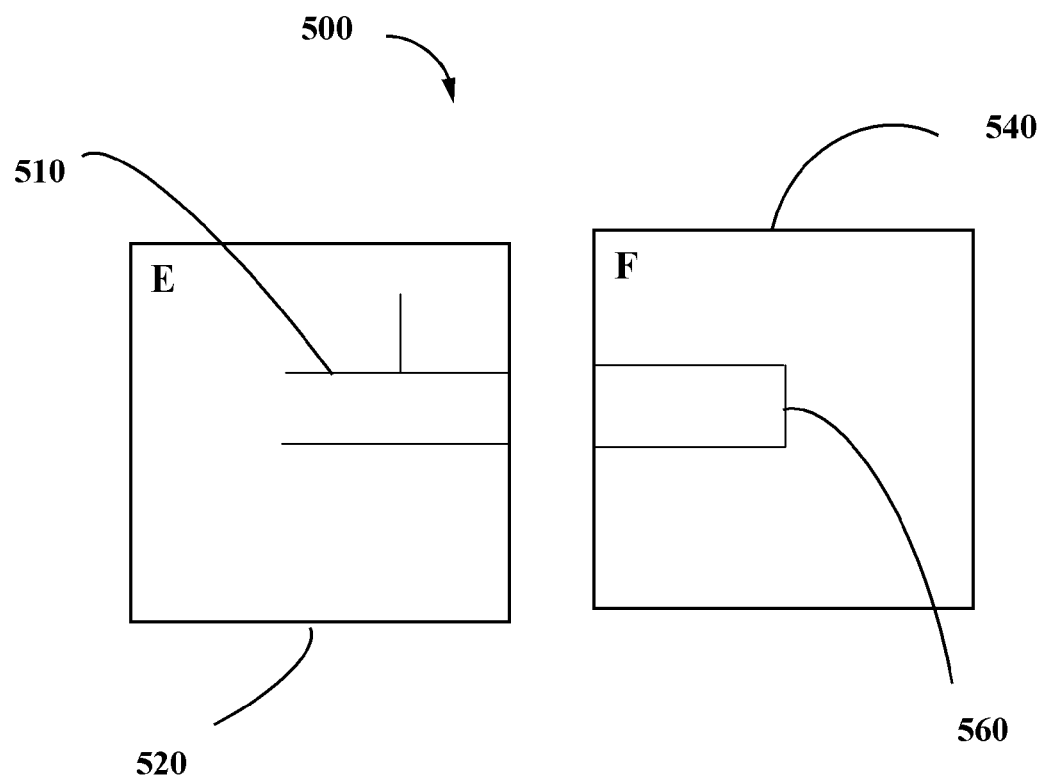
FIG. 5*a* is a schematic diagram of two images according to another embodiment of the invention.
Figure 5B:
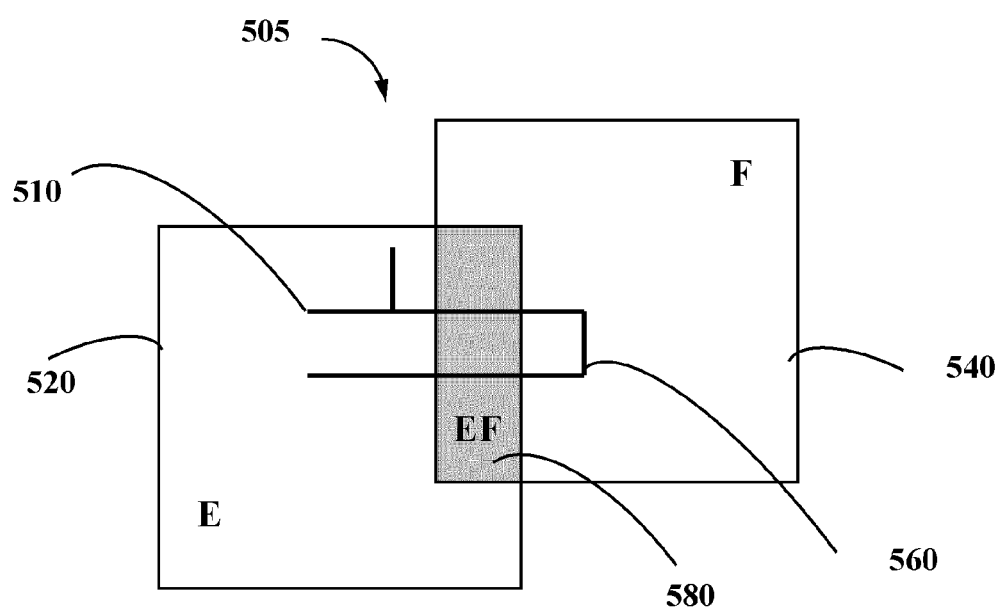
FIG. 5*b* is a schematic diagram of two images aligned for connectivity tracing according to another embodiment of the invention.

Step 360, of FIGS. 3a and 3b, is explained in further detail with reference to FIG. 4a. FIG. 4a provides a method 400 of tracing connectivity for a single connected component according to an embodiment of the invention. The method 400 can be better understood with reference to the pictorial representation of a mosaic of two images E 520 and F 540 shown in FIGS. 5a and 5b. FIG. 5b shows an aligned version of images E 520 and F 540 shown in FIG. 5a.

Referring to FIG. 5b, the aligned mosaic 505 comprises image E 520 and image F 540. The positioning of images E 520 and F 540 produces an overlap region EF 580. An image feature 560 is located in image E 520, in image F 540 and in overlap region EF 580. For the purposes of explaining the method 400, the feature 560 has a starting point 510.

With reference to FIG. 4a, a representation of the image E 520 containing the starting point 510 is placed in a queue at step 402. According to this embodiment, a standard queue class from, for example, the Silicon Graphics Standard Template Library is used. Other appropriate queues will be apparent to those skilled in the art. At step 404, the starting point 510 is marked, i.e., the source object is marked. The cycle beginning at step 406 is operative when a representation of an image element is present in the queue, i.e., the cycle is operative while the queue of represented image elements is non-empty. The representation of image E 520 is de-queued at step 408. At step 412, all objects within the image E 520 that are connected to the starting point 510 are marked. Because the objects being marked in step 412 are not in the overlap area, step 410 is not performed. However, step 414 is performed, and the representation of the overlap area EF 580 is placed in the queue. It should be mentioned that various queuing schemes, such as First In, First Out (FIFO), may be applied to operatively queue the representations. Finally, the method 400 is returned to step 406 through cycle 415.

For the next cycle of steps 406 through to cycle 415, step 408 takes a representation of the overlap region EF 580 as the next first element in the queue. At step 410, all objects within the region EF 580 that are connected to the already marked object are marked. At step 414, a representation of the image F 540 is now placed in the queue as the portion of feature 560 within the overlap region 560 that has been marked also lies within the image F 540. The method 400 returns to step 406 and the image F 540 is processed. The method continues to cycle until all of the regions of the feature 560 have been marked, which results in the tracing of the connectivity provided by the feature 560. At the end of the method the queue will be empty. It shall be understood that the term queue is used generically. It can be implemented using a First In, First Out (FIFO) queue, giving rise to a Breadth First Search (BFS) visiting pattern. The queue in methods 400 and 450 (to be discussed below) allows the algorithm to follow a Breadth First Search (BFS) graph search algorithm, which will be known to the skilled artisan as a reasonably efficient means for determining connectivity. With this approach images and overlap areas where new connectivity information could be discovered are queued. Once queued, they can be processed in a defined way. The above approach is more efficient and less prone to errors than manual approaches that may have been traditionally implemented by an operator while tracing connectivity in a maze of potential connections.

The embodiments of the present invention also contemplate utilizing a Last In, First Out (LIFO) queue, as opposed to the FIFO queue, giving rise to a Depth-first search (DFS) visiting pattern or some sort of priority queue to achieve the desired performance for the underlying data structure, or some data structure to allow for multiple processors.

Further, the use of a queue for holding images prior to processing allows the automated system to provide forward-looking insight into the direction of processing. As such the system may go between levels and follow different directions. In the embodiment shown in FIGS. 5a and 5b, the image E 520 and the image F 540 are located within the same plane such that the mosaic created thereby is representational of a 2D model. The methods of the current embodiment are equally applicable to images that are on different depth planes such that the mosaic of the images is representational of a 3D model. Thus the case of a 3D mosaic is within the scope of the invention.

Figure 4B:
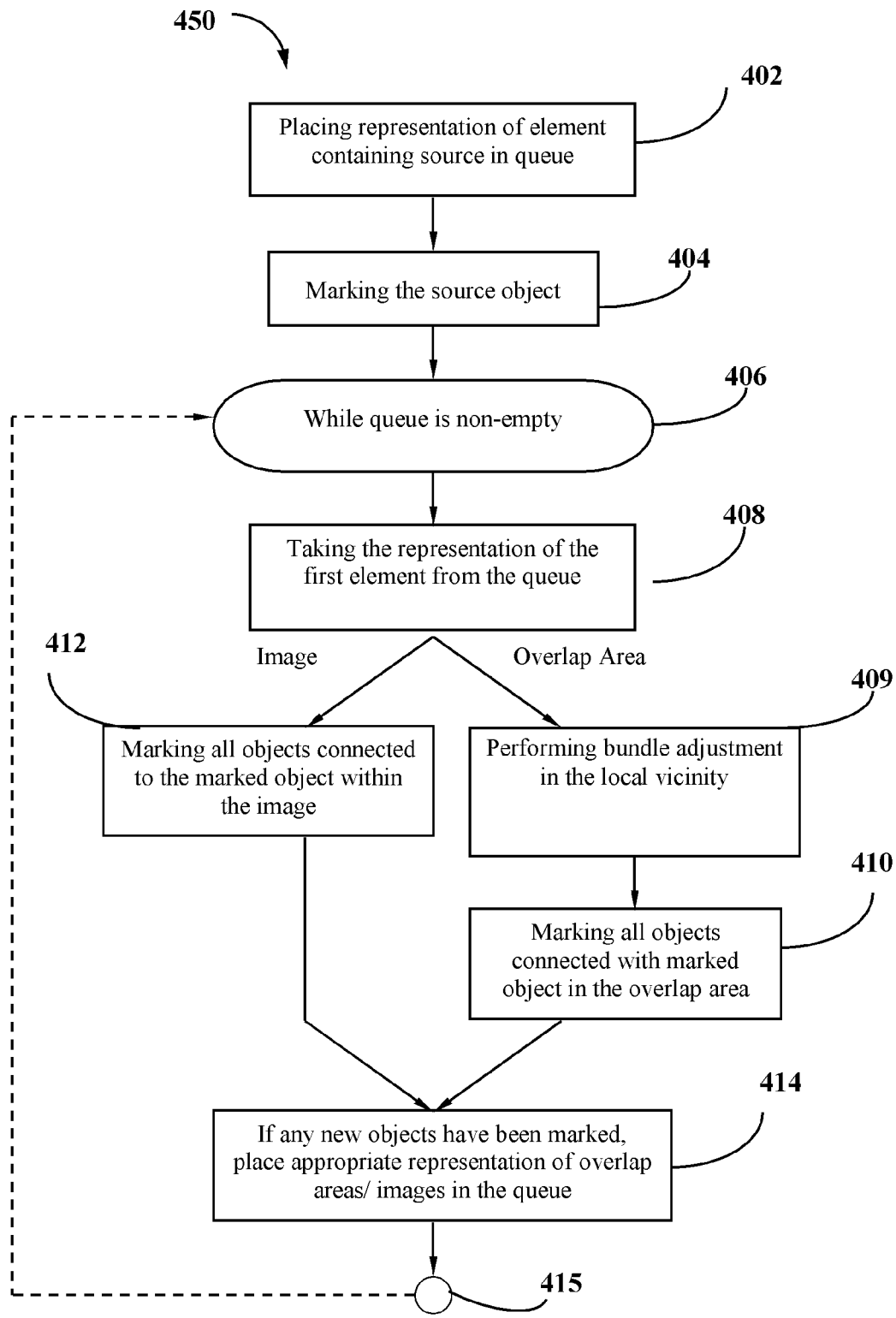
FIG. 4*b* is a flow chart of image analysis according to another embodiment of the invention.

In an alternative embodiment, FIG. 4b presents a method 450 that is similar to method 400 with an additional step 409 provided. In step 409, a bundle adjustment procedure is performed in the local vicinity of the marked feature. The inclusion of a bundle adjustment step may help identify erroneously identified overlap areas.

Figure 7:
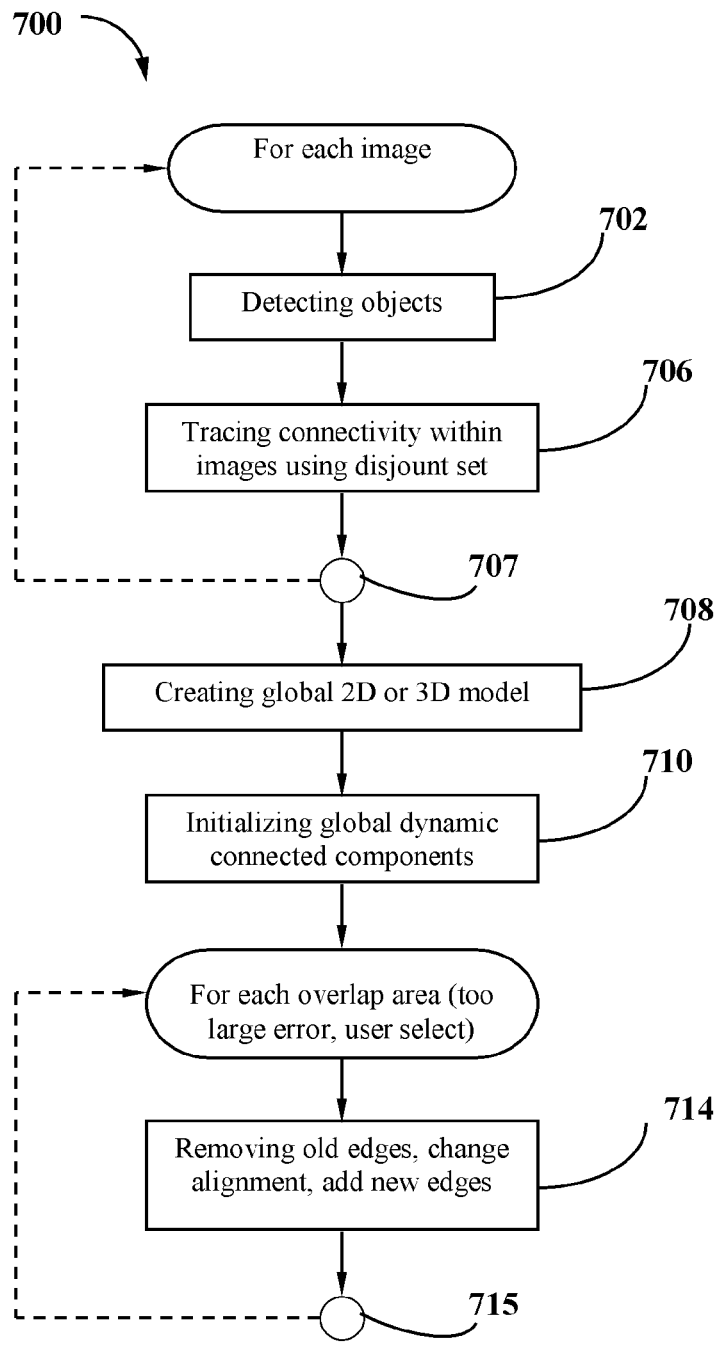
FIG. 7 is a flow chart of connectivity tracing according to an embodiment of the invention.

In an alternative embodiment of the invention connectivity tracing is performed on a coarse 3D model, then error correction is implemented in any areas that have either a large error or are user selected. The method 700 according to this embodiment is shown in FIG. 7. Objects within an image are detected at step 702 and connectivity within the image is then traced using disjoint sets at step 706. Other equivalent data structures will be apparent to the skilled artisan and are encompassed within the scope of the invention. The above steps are repeated through cycle 707 until connectivity is traced for each image within the mosaic.

With object detection completed, a global 2D or 3D model is created at step 708. At step 710, the global dynamic connected components are initialized. Step 710 creates a connectivity graph with consideration to the connectivity that was traced within each image. The vertices of the graph created at step 710 are either individual objects detected within images, or disjoint sets detected within each image. If the vertices are individual objects, step 706 is not required.

Next, the connectivity graph is changed with consideration to errors that may have occurred in specific overlap areas. Therefore, each overlap area that has either a large error after bundle adjustment, or that is spotted by an operator as being misaligned are selected and a correction procedure is performed at step 714. The correction procedures performed at step 714 include old edge removal, changing of alignment, and adding new edges. The above error correction procedures are not to be seen as limiting the scope of the embodiments of the invention. Any error correction procedures as will be apparent to the skilled artisan are within the scope of the invention.

The method 700 presented in FIG. 7 has been created assuming that the dynamic connected components data structure is maintained on the connectivity graph. However, the connected components algorithm is often quite fast in which case it may be more beneficial to use static connected components instead of the much more complicated dynamic ones. Therefore in an alternative embodiment where static connected components are used, a connectivity graph would be created at step 710 and an additional step of tracing the connected components would be added to the method 700 directly adjacent to step 710.

In the discussion of the various embodiments with reference to the drawings, the term "overlap area" has been referred to describe an area of overlap between two images where the images lie on the same plane. It will be apparent to the skilled artisan that the term is also applicable to overlap between images on different planes as might be found in a 3D model.

Figure 8:
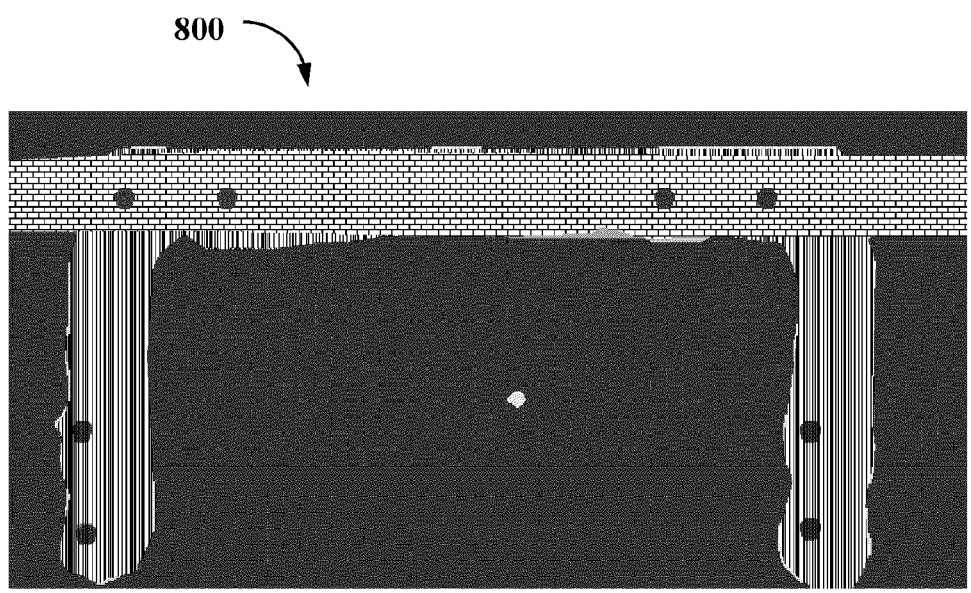
FIG. 8 is a schematic diagram of a region containing overlap areas in both the planar and depth dimensions according to another embodiment of the invention

FIG. 8 is a schematic diagram 800 of a region containing overlap areas in both the planar and depth dimensions. The diagram 800 schematically presents two interconnect lines and the vias, therebetween. In this example, there are two metal layers: a first layer of a cross-hatch pattern representing interconnects lines, and a second layer of striped vertical lines. The black circles represent vias.

The various embodiments have considered the local tracing of connectivity. Once connectivity information is established, there are numerous possibilities applicable for deriving a schematic diagram. For example, an advanced schematics editor, such as that disclosed in U.S. Pat. No. 7,013,028, can be utilized to assist user to visualize the connectivity information while manually drawing schematics. Alternatively, U.S. Pat. No. 6,907,583, teaches means for automated extraction of connectivity information by calculating vector layout representation of image data and by computing the netlist of extracted gates using this connectivity information.

It should be mentioned that the schematic diagram produced according to embodiments of the present invention, i.e., through local tracing of connectivity, is distinguishable from schematic diagrams produced from global tracing, i.e., by producing a global model. For example, schematic diagrams may contain location attributes which specify the physical location and layer of various objects (component, pin, wire) in the layout. Based on the location as indicated by the attribute within the layout or mosaic, the method utilized for signal tracing—local or global—may be deduced. That is, if inconsistencies are present in these attributes, it may be concluded that a method of local signal tracing was used to trace connectivity between images.

It is within the scope of the present invention to apply the methods of the various embodiments to fields beyond the field of reverse engineering of ICs. Namely the methods of tracing connectivity may be applied to physically connected elements that have some sort of communication therebetween. In alternative embodiments, the methods could be applied to fields including, but not limited to, infrastructure such as roads and gas pipelines. In the above examples, the communication of signals may be replaced by the flow of traffic along roads or the flow of gas within a pipeline, whereby signal continuity allows for the flow of these signals between locations within a city or ends of the pipeline, respectively. In these examples, connectivity would be traced from a plurality of aerial photographs, whereby the local tracing is performed on pairs of aerial photographs. In the case of roads, the shortest distance between two locations or elements may be determined through local tracing of roads. The end result of this analysis would be a diagrammatic representation of the system having both the elements that are interconnected, as well as signal continuity information related to these elements. As in the case of schematic diagram, location attributes may be associated with the various elements in the diagram, such that these attributes indicate from what photographs the information was derived.

In an alternative embodiment of the invention a system that is suitable for performing the methods outlined in various embodiments of the invention is provided.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of tracing connectivity within a mosaic of images to derive a data structure representative of a schematic diagram of the connectivity, the mosaic comprising a first object having a first portion in a first image, a second portion in a second image, and a third portion in a region of overlap between the first image and the second image, the first portion having a source of the first object, the method being performed by a computing device having one or more processors, the method comprising steps of:

(a) placing a representation of the first portion in a queue;
 (b) marking the source;
 (c) taking the representation of the first portion from the queue;
 (d) marking the first portion and the third portion, wherein the first portion comprises the source and the third portion is connected to the first portion;
 (e) placing a representation of the third portion in the queue;
 (f) taking the representation of the third portion from the queue; and
 (g) marking the third portion and the second portion, the third portion being connected to the second portion on the second image; and
 (h) marking the first portion to provide a connectivity trace from the first portion to the second portion.

2. The method according to claim 1, further comprising step (i) of performing a bundle adjustment operation for the region of overlap between the first image and the second image.

3. The method according to claim 1, wherein a breadth first search flow is implemented.

4. The method according to claim 3, wherein the first object represents a circuit element, and
 wherein the method further comprises determining signal continuity information of the circuit element through local tracing.

* * * * *